US012649622B2

(12) United States Patent
Chan et al.

(10) Patent No.: US 12,649,622 B2
(45) Date of Patent: Jun. 9, 2026

(54) FORK CROSSHAIRS

(71) Applicant: Oshkosh Corporation, Oshkosh, WI (US)

(72) Inventors: Brendan Chan, Oshkosh, WI (US); Greg Steffens, Oshkosh, WI (US); Ryan Wolf, Oshkosh, WI (US); Jeff Verhagen, Oshkosh, WI (US); Jeremy Andringa, Oshkosh, WI (US); Mitchell Murphy, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 399 days.

(21) Appl. No.: 18/214,783

(22) Filed: Jun. 27, 2023

(65) Prior Publication Data

US 2023/0415983 A1 Dec. 28, 2023

Related U.S. Application Data

(60) Provisional application No. 63/356,109, filed on Jun. 28, 2022.

(51) Int. Cl.
*B65F 3/04* (2006.01)
*B65F 3/02* (2006.01)

(52) U.S. Cl.
CPC ...... *B65F 3/041* (2013.01); *B65F 2003/0223* (2013.01)

(58) Field of Classification Search
CPC ........................................................ B65F 3/041
See application file for complete search history.

(56) References Cited

U.S. PATENT DOCUMENTS

| | | | | |
|---|---|---|---|---|
| 10,633,181 | B2 * | 4/2020 | Butcher | B65F 3/00 |
| 11,042,750 | B2 * | 6/2021 | Wildgrube | B65F 3/041 |
| 12,083,950 | B1 * | 9/2024 | Aguirre Contreras | G01S 17/931 |
| 2019/0276102 | A1 | 9/2019 | Zuleger et al. | |
| 2020/0189455 | A1 * | 6/2020 | Berreur | B60Q 1/545 |
| 2020/0247609 | A1 * | 8/2020 | Maroney | B65F 3/04 |
| 2020/0290237 | A1 | 9/2020 | Steffens et al. | |
| 2020/0291846 | A1 | 9/2020 | Steffens et al. | |
| 2020/0339346 | A1 * | 10/2020 | Maroney | B65F 3/041 |
| 2021/0171137 | A1 | 6/2021 | Zuleger et al. | |
| 2021/0197846 | A1 * | 7/2021 | Thakur | B60Q 1/545 |
| 2021/0261391 | A1 * | 8/2021 | Theos | B66F 9/07568 |
| 2021/0276643 | A1 | 9/2021 | Ellifson et al. | |

(Continued)

*Primary Examiner* — Jonathan Snelting
(74) *Attorney, Agent, or Firm* — Foley & Lardner LLP

(57) ABSTRACT

A refuse vehicle includes a chassis, a body coupled to the chassis, a cab coupled to the chassis and positioned in front of the body, a lift assembly coupled to at least one of the chassis or the body. The lift assembly includes a first arm, a second arm, an implement coupled to the first arm and the second arm, and an actuator positioned to pivot the first arm and the second arm to facilitate repositioning the implement between a plurality of positions including a stowed position where the implement is positioned above the body, a working position where the implement is positioned in front of the cab, and a transit position between the stowed position and the working position. The lift assembly further includes one or more projectors coupled to the implement. The one or more projectors are positioned to provide a visual indication of the alignment of the implement with respect to an external target.

20 Claims, 18 Drawing Sheets

(56) References Cited

U.S. PATENT DOCUMENTS

| | | | | |
|---|---|---|---|---|
| 2021/0292086 | A1 | 9/2021 | Mahan et al. | |
| 2021/0323763 | A1 | 10/2021 | Koga et al. | |
| 2021/0323764 | A1 | 10/2021 | Koga et al. | |
| 2021/0323765 | A1 | 10/2021 | Koga et al. | |
| 2021/0325529 | A1 | 10/2021 | Koga et al. | |
| 2021/0325911 | A1 | 10/2021 | Koga et al. | |
| 2021/0345062 | A1 | 11/2021 | Koga et al. | |
| 2021/0373560 | A1 | 12/2021 | Koga et al. | |
| 2022/0033181 | A1 | 2/2022 | Koga et al. | |
| 2022/0072736 | A1 | 3/2022 | Steffens et al. | |
| 2022/0097527 | A1 | 3/2022 | Koga et al. | |
| 2022/0097961 | A1 | 3/2022 | Koga et al. | |
| 2022/0097964 | A1 | 3/2022 | Koga et al. | |
| 2022/0118854 | A1 | 4/2022 | Davis et al. | |
| 2022/0185582 | A1 | 6/2022 | Koga et al. | |
| 2022/0348134 | A1* | 11/2022 | Beernaert | B60Q 1/26 |
| 2023/0002152 | A1 | 1/2023 | Koga et al. | |
| 2023/0070279 | A1 | 3/2023 | Wheeler et al. | |
| 2023/0070769 | A1 | 3/2023 | Wheeler et al. | |
| 2023/0074504 | A1 | 3/2023 | Ellifson et al. | |
| 2023/0089417 | A1 | 3/2023 | Koga et al. | |
| 2023/0150584 | A1 | 5/2023 | Zeamer et al. | |
| 2023/0150763 | A1 | 5/2023 | Haberlein et al. | |
| 2023/0184934 | A1 | 6/2023 | Koga et al. | |
| 2023/0191887 | A1 | 6/2023 | Rausch et al. | |
| 2023/0192401 | A1 | 6/2023 | Zeamer et al. | |
| 2023/0211705 | A1 | 7/2023 | Zeamer et al. | |
| 2023/0264601 | A1 | 8/2023 | Haberlein et al. | |
| 2023/0278425 | A1 | 9/2023 | Miller et al. | |
| 2023/0278475 | A1 | 9/2023 | Steffens et al. | |
| 2023/0294915 | A1 | 9/2023 | Koga et al. | |

* cited by examiner

FORK CROSSHAIRS

CROSS-REFERENCE TO RELATED PATENT APPLICATIONS

This application claims the benefit of and priority to U.S. Provisional Application No. 63/356,109, filed Jun. 28, 2023, the entire disclosure of which is incorporated by reference herein.

BACKGROUND

The present disclosure relates generally to vehicles. More specifically, the present disclosure relates to a visual guidance system for vehicle lifting systems and apparatuses.

SUMMARY

One embodiment relates to a refuse vehicle. The refuse vehicle includes a chassis, a body coupled to the chassis, a cab coupled to the chassis and positioned in front of the body, a lift assembly coupled to at least one of the chassis or the body. The lift assembly includes a first arm, a second arm, an implement coupled to the first arm and the second arm, and an actuator positioned to pivot the first arm and the second arm to facilitate repositioning the implement between a plurality of positions including a stowed position where the implement is positioned above the body, a working position where the implement is positioned in front of the cab, and a transit position between the stowed position and the working position. The lift assembly further includes one or more projectors coupled to the implement. The one or more projectors are positioned to provide a visual indication of the alignment of the implement with respect to an external target.

Another embodiment relates to a refuse vehicle. The refuse vehicle includes a chassis, a body, and lift assembly. The body is coupled to the chassis and includes a cab. The lift assembly is coupled to at least one of the chassis or the body. The lift assembly includes an implement coupled to the at least one of the chassis or the body, and includes a first moveable appendage and a second moveable appendage. The lift assembly further includes an actuator positioned to move at least one of the first moveable appendage or the second moveable appendage to facilitate engaging the implement with an external target. The lift assembly further includes one or more projectors coupled to at least one of the first moveable appendage or the second moveable appendage. The one or more projectors are positioned to provide a visual indication of alignment of the implement with respect to the external target Another embodiment relates to a refuse vehicle. The refuse vehicle includes a chassis, a body, and at least one manual system. The body is coupled to the chassis and includes a cab. The at least one manual system is coupled to the body and operable from an exterior of the body. The at least one manual system includes an operational zone including an area proximate the manual system. The refuse vehicle further includes one or more projectors coupled to the body. The one or more projectors are positioned to provide a visual indication of the operational zone of a ground plane.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a chassis, a body coupled to the chassis, a cab coupled to the chassis and positioned in front of the body, and a lift assembly coupled to at least one of the chassis or the body. The lift assembly includes a first arm, a second arm, an implement coupled to the first arm and the second arm, and an actuator positioned to pivot the first arm and the second arm to facilitate repositioning the implement between a plurality of positions including a stowed position where the implement is positioned above the body, a working position where the implement is positioned in front of the cab, and a transit position between the stowed position and the working position. In some embodiments, the implement is one or more fork members configured for lifting an external target (e.g., a trash container, dumpster, etc.). The lift assembly further includes one or more projectors which may be coupled to the fork members. The one or more projectors are positioned to provide a visual indication of the alignment of the fork members with respect to the target. The one or more projectors may be vertically offset from one another in order to project a lower-most point of the fork members and an upper most point of the fork members. The one or more projectors may also provide a visual indication of the working envelope of the lift assembly to warn passersby or otherwise indicate a zone on the ground for operation relative to the vehicle.

Overall Vehicle

Figure 1:
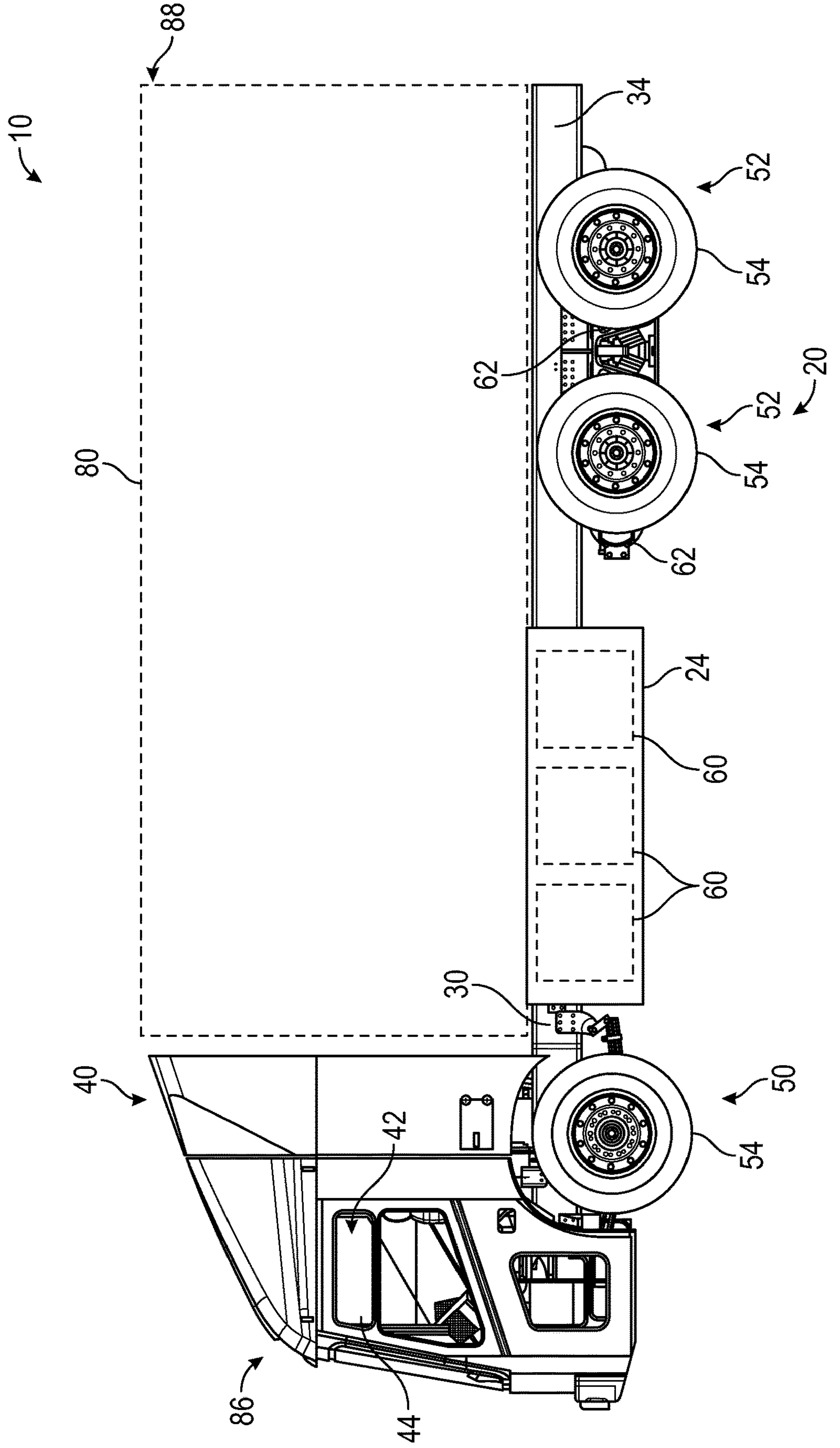
FIG. 1 is a left side view of a vehicle, according to an exemplary embodiment.
Figure 2:
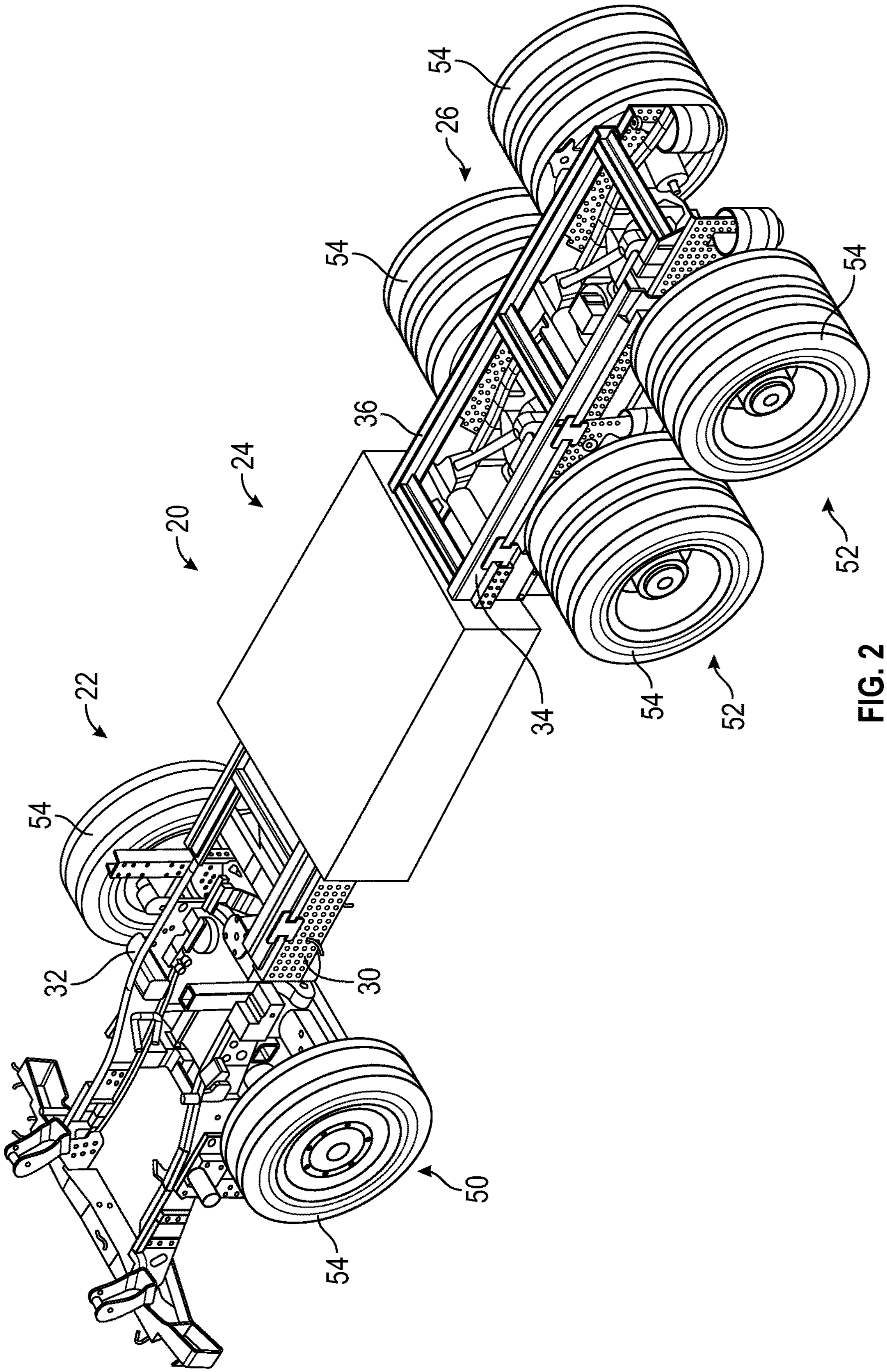
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
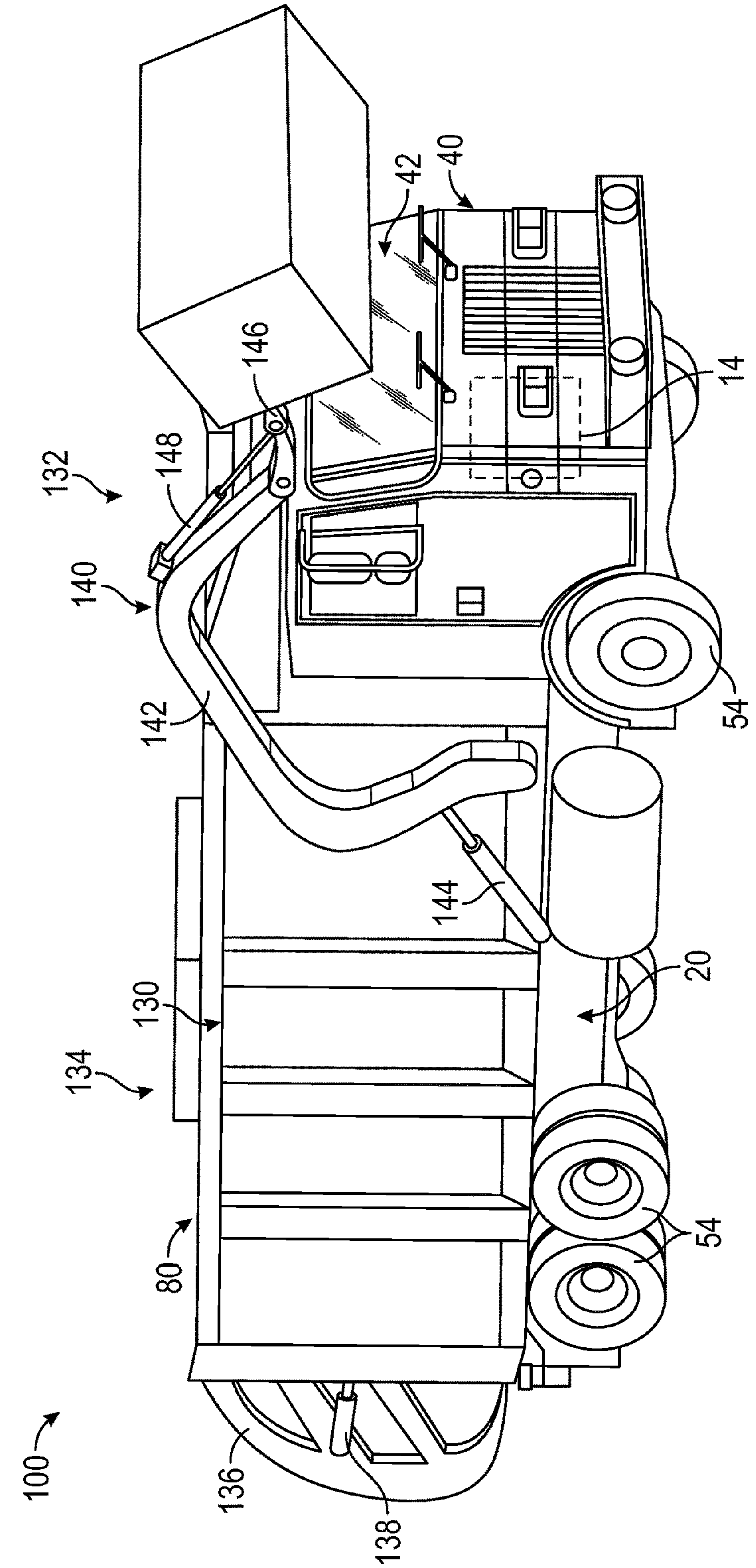
FIG. 3 is a perspective view of the vehicle of FIG. 1 configured as a front-loading refuse vehicle, according to an exemplary embodiment.
Figure 4:
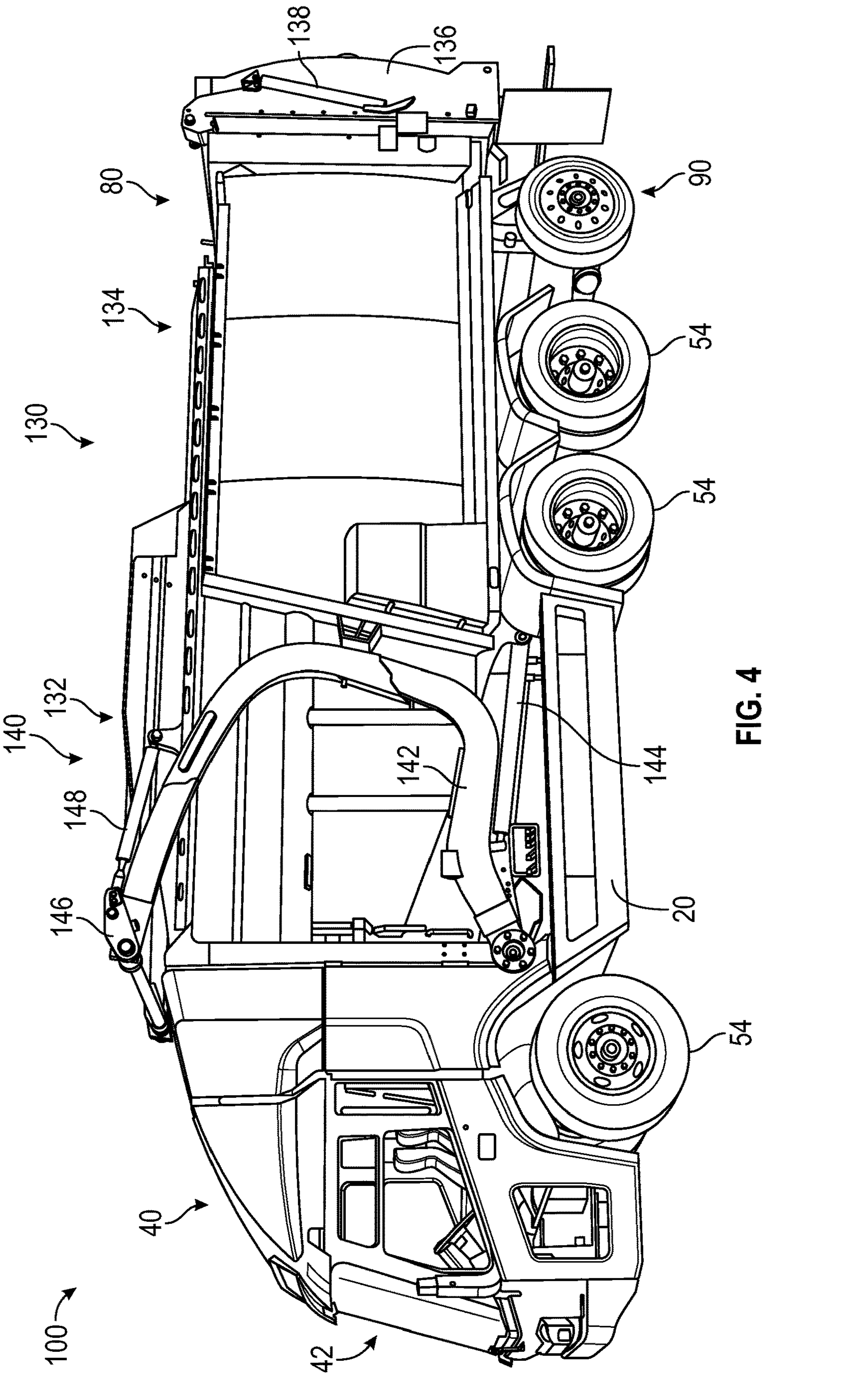
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
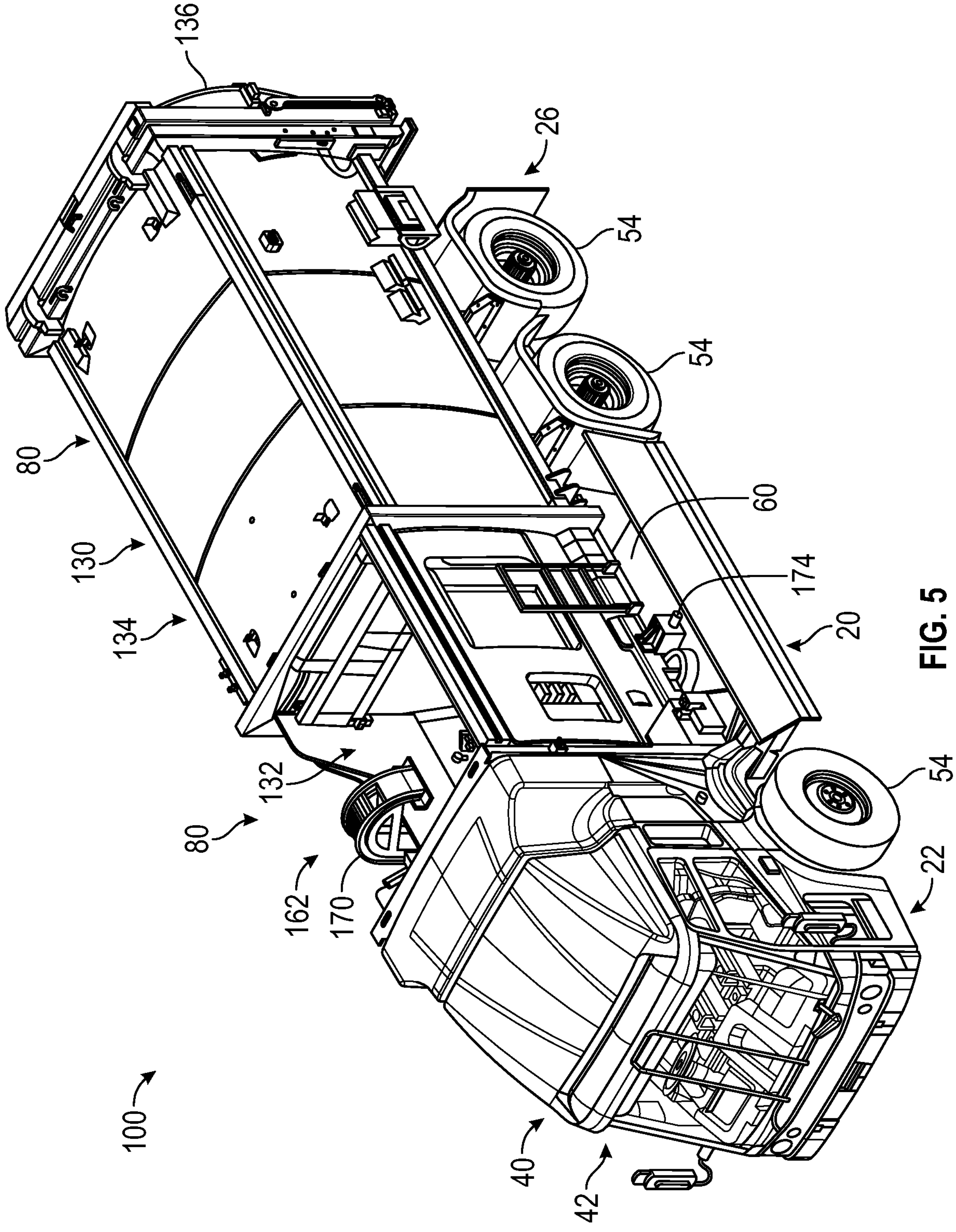
FIG. 5 is a perspective view of the vehicle of FIG. 1 configured as a side-loading refuse vehicle, according to an exemplary embodiment.
Figure 6:
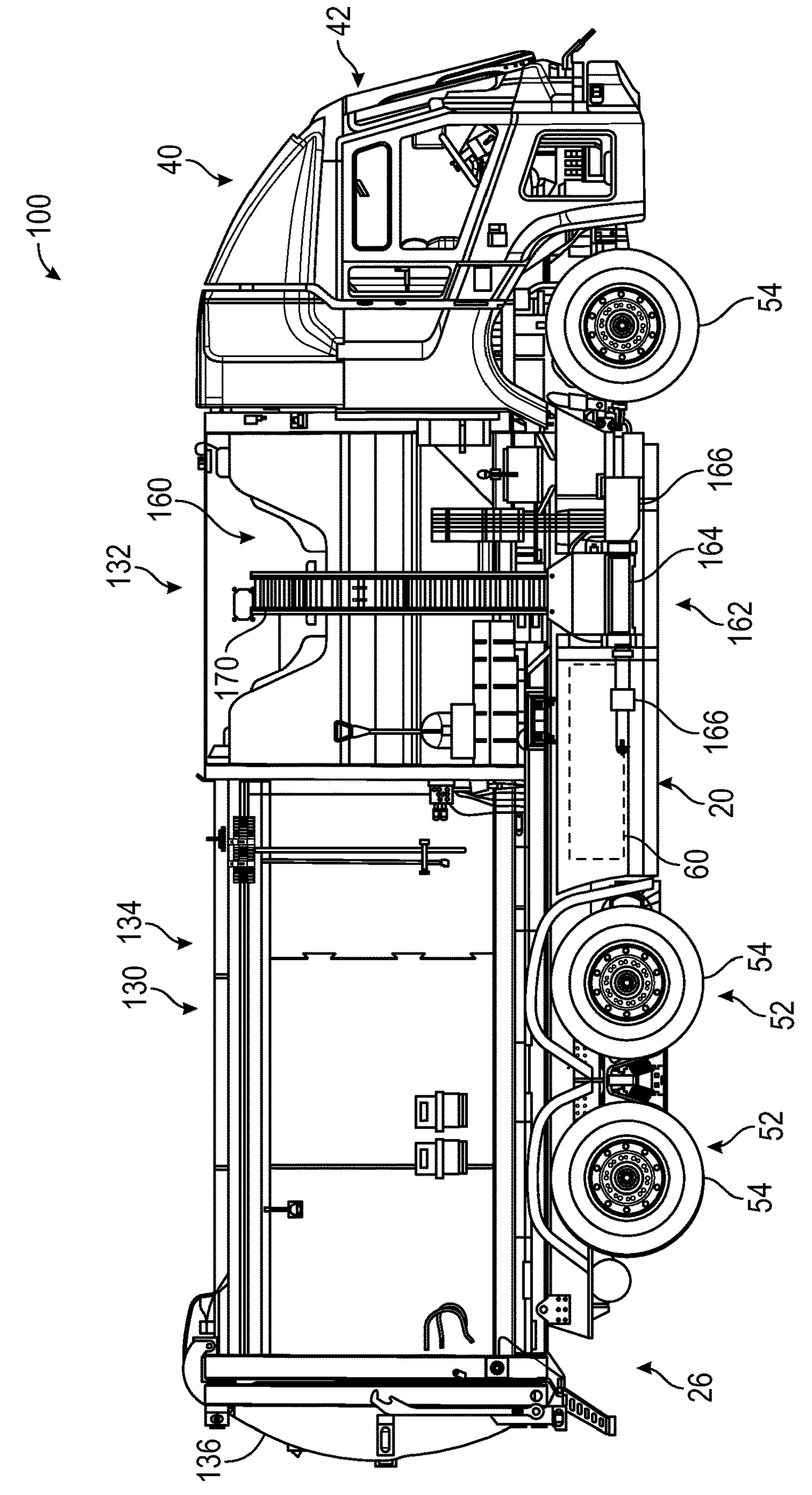
FIG. 6 is a right side view of the side-loading refuse vehicle of FIG. 5.
Figure 7:
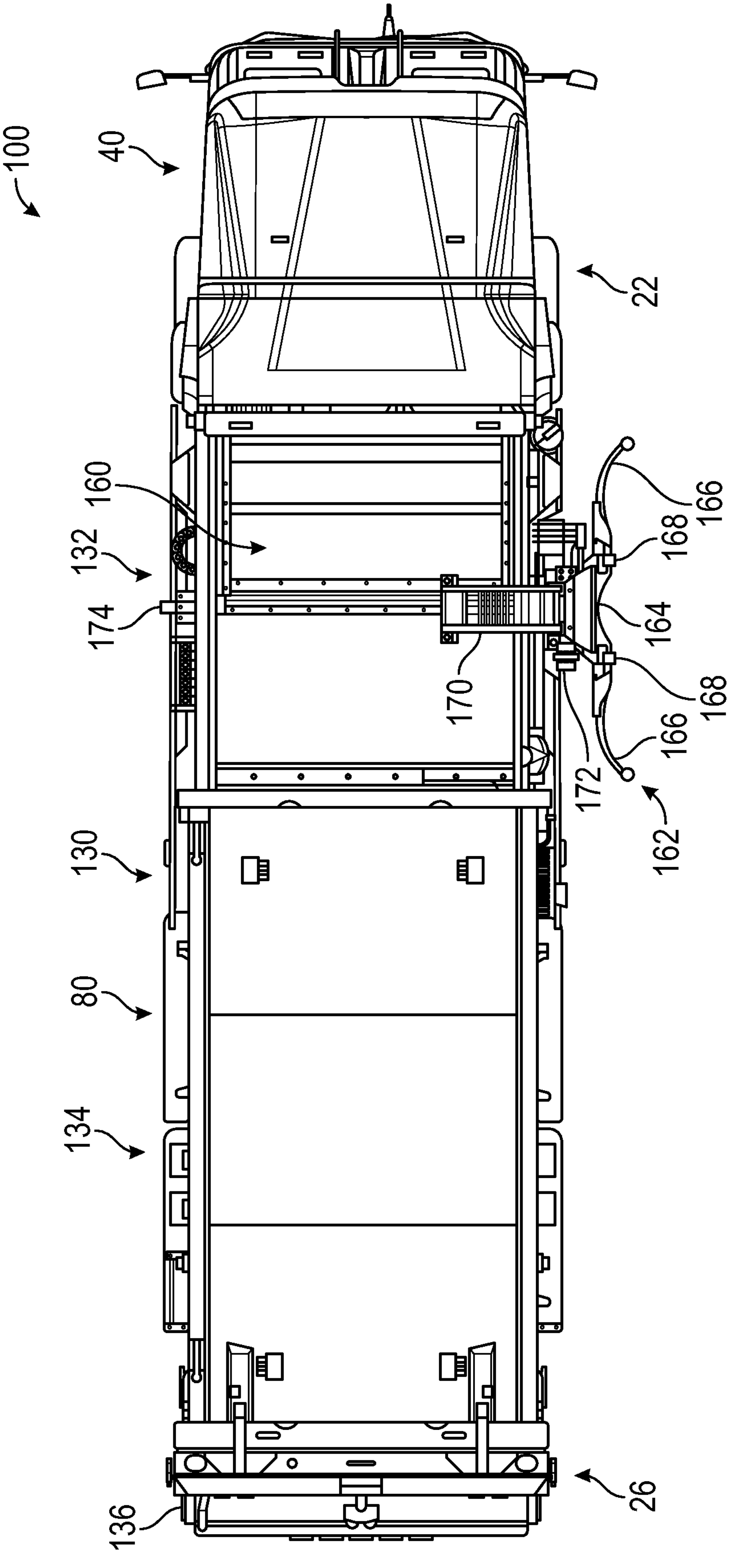
FIG. 7 is a top view of the side-loading refuse vehicle of FIG. 5.
Figure 8:
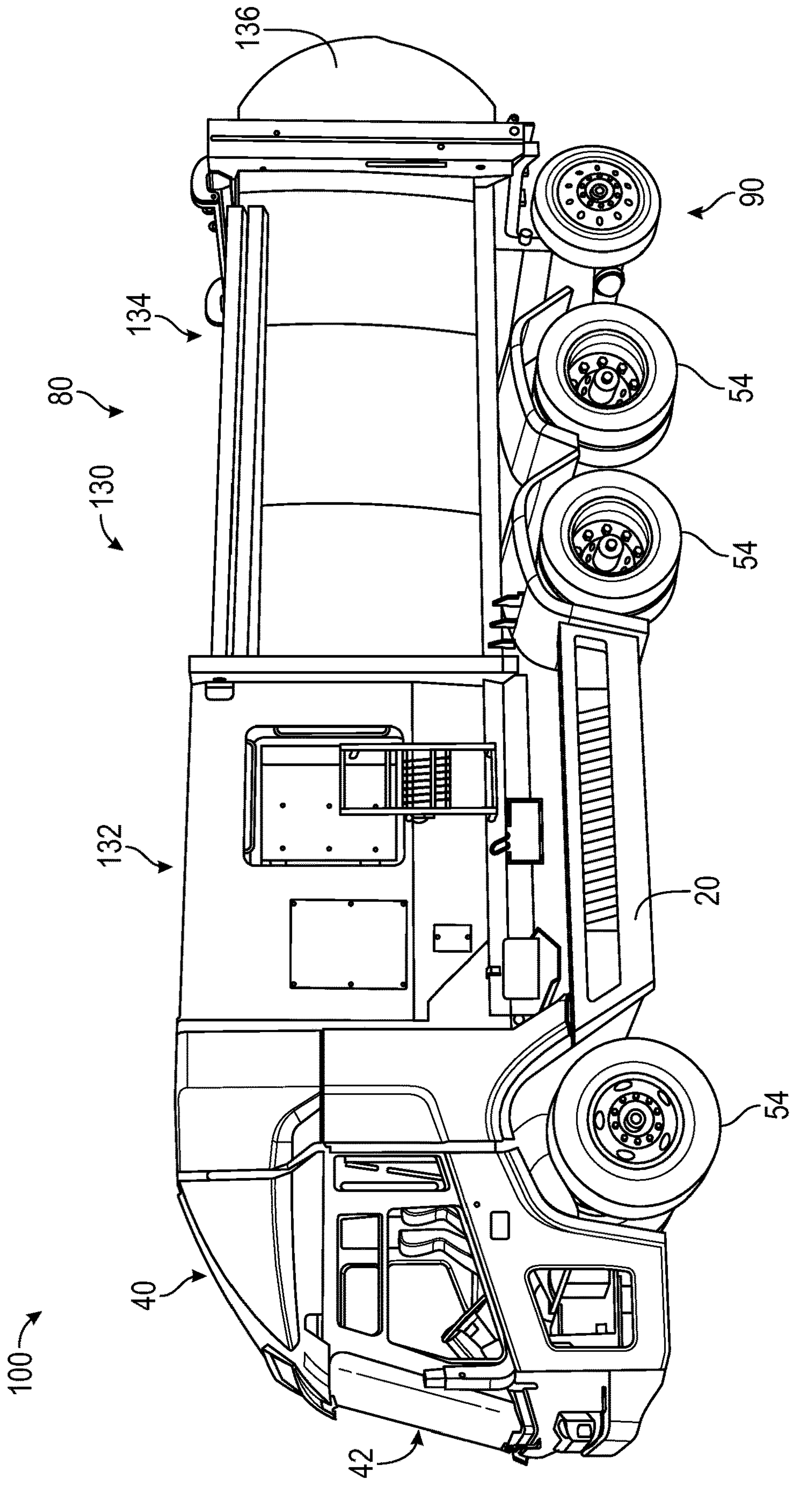
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
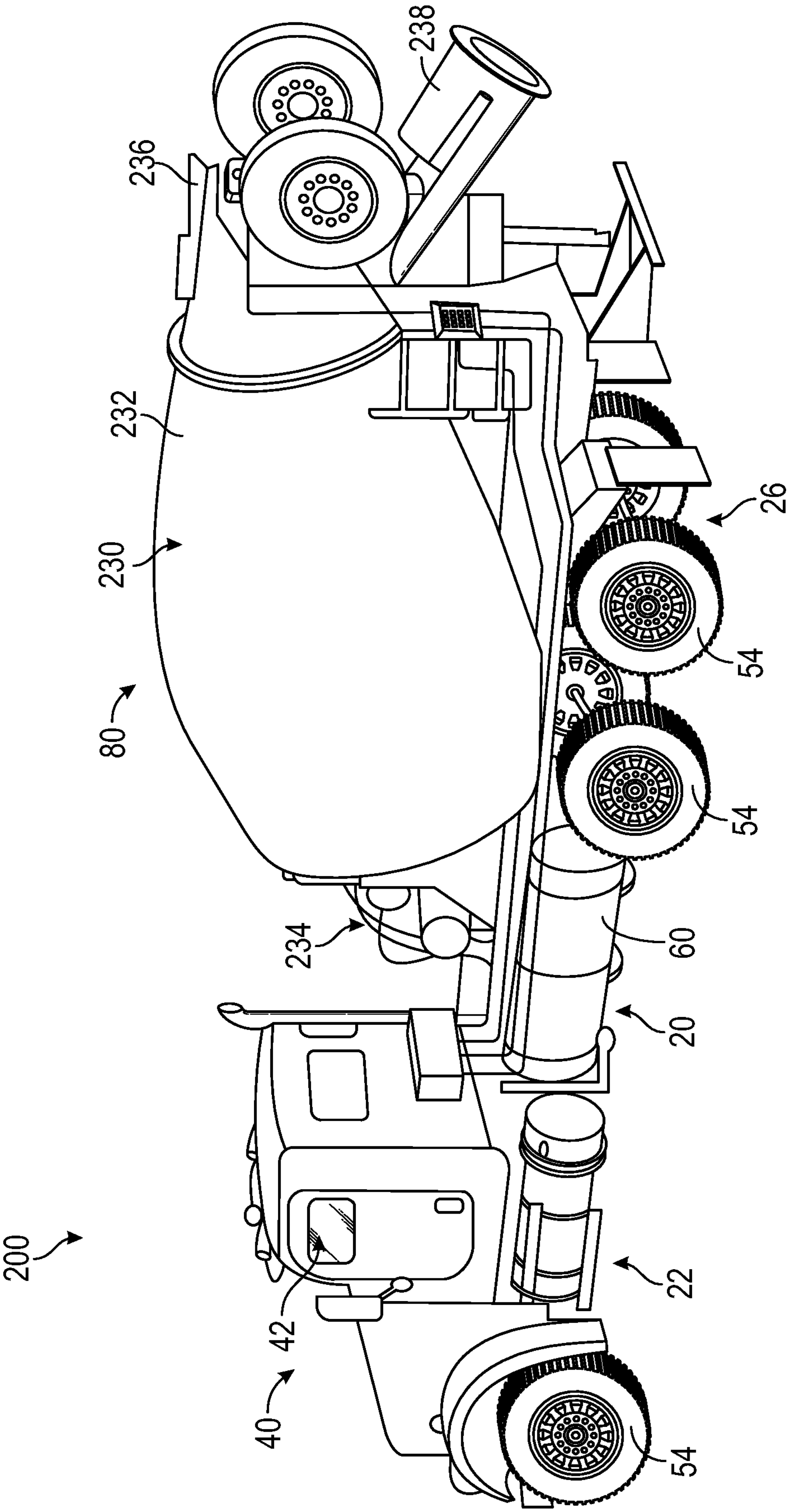
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
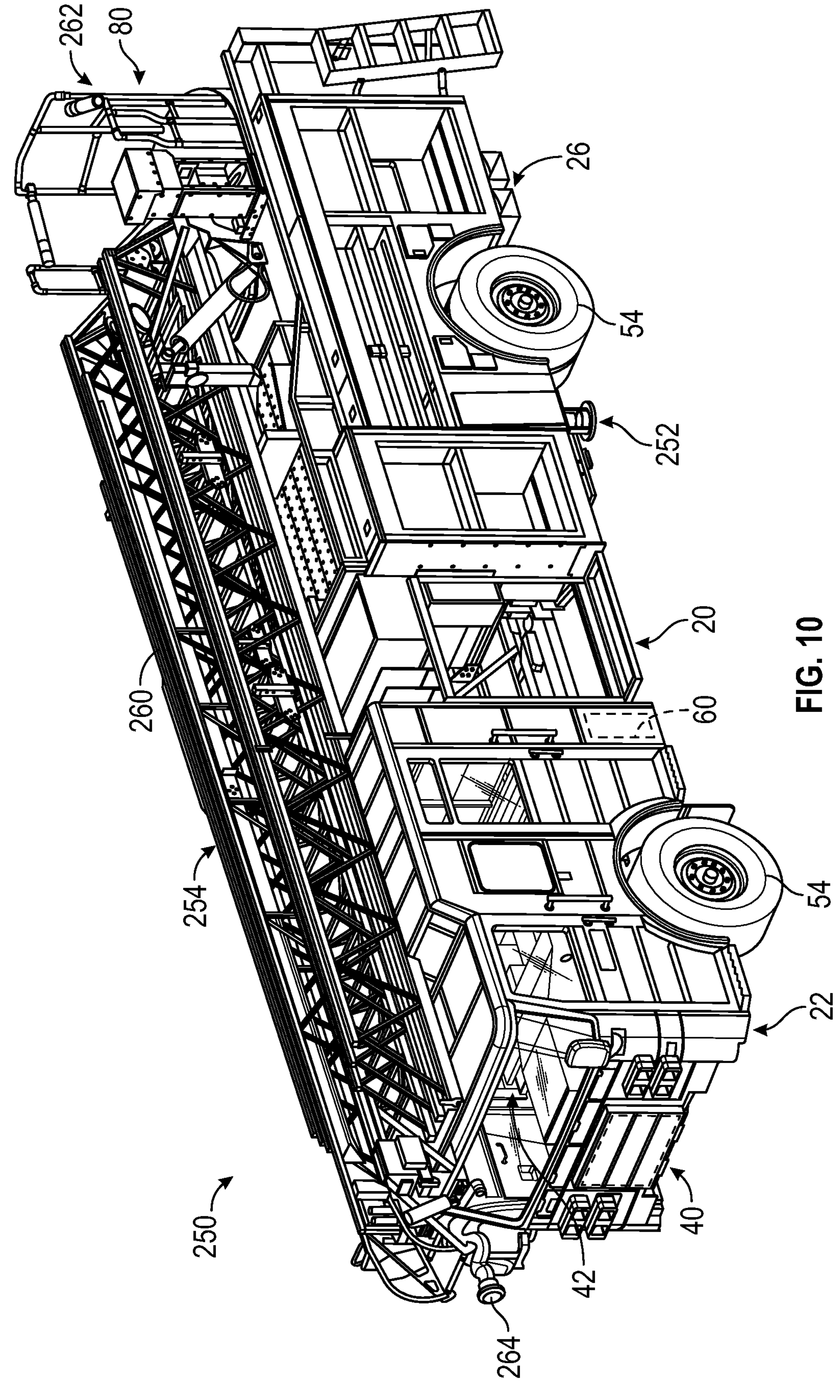
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an onboard water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
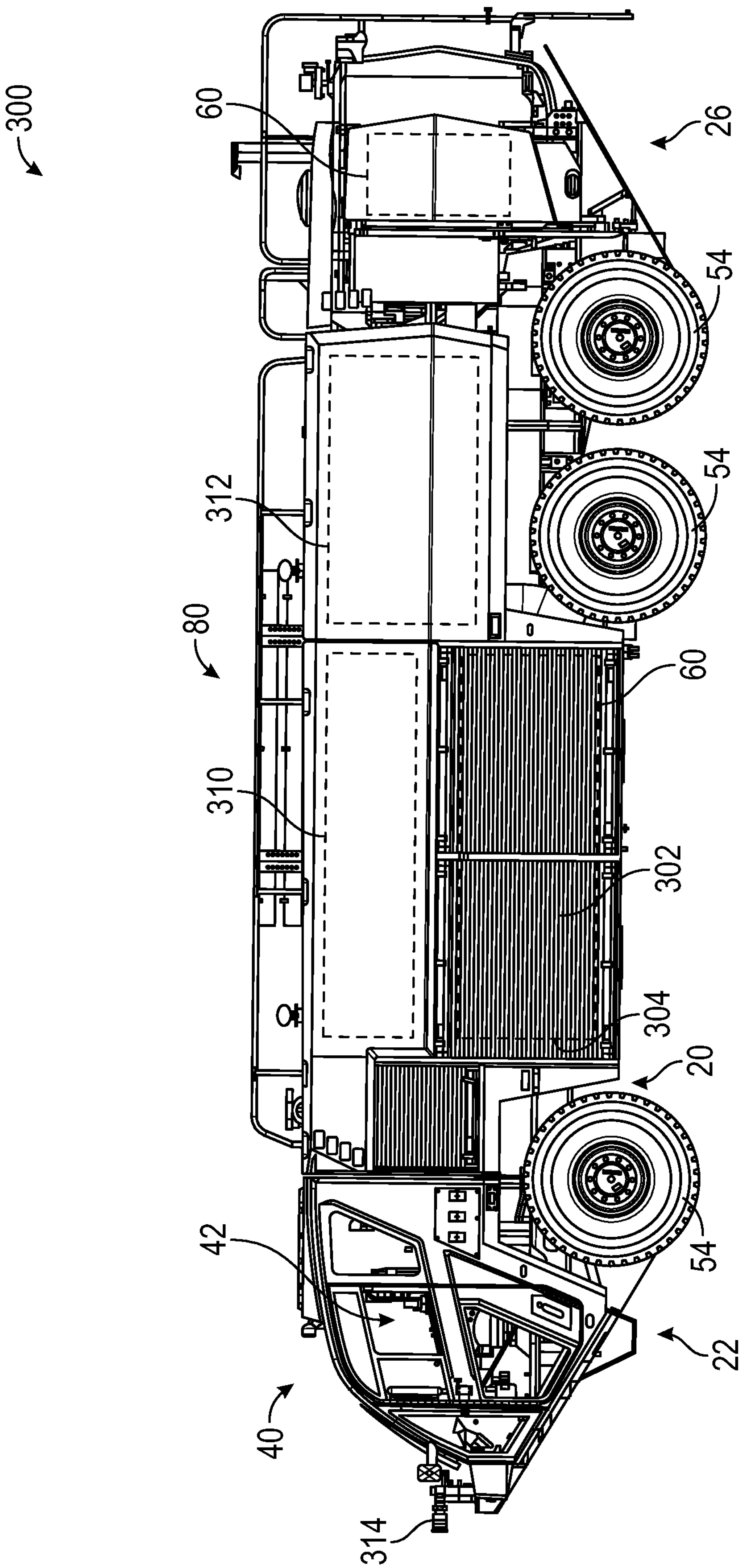
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
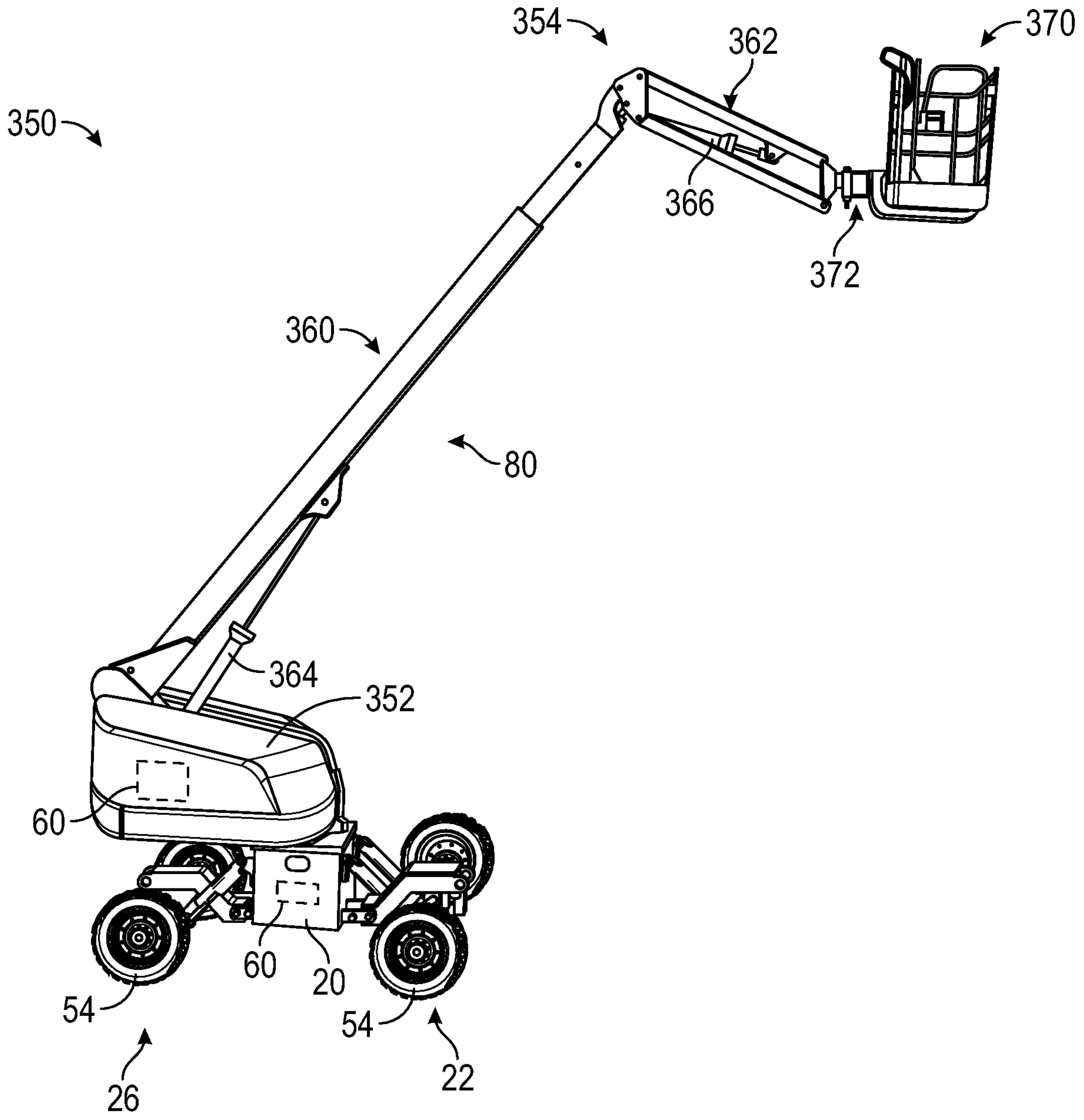
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
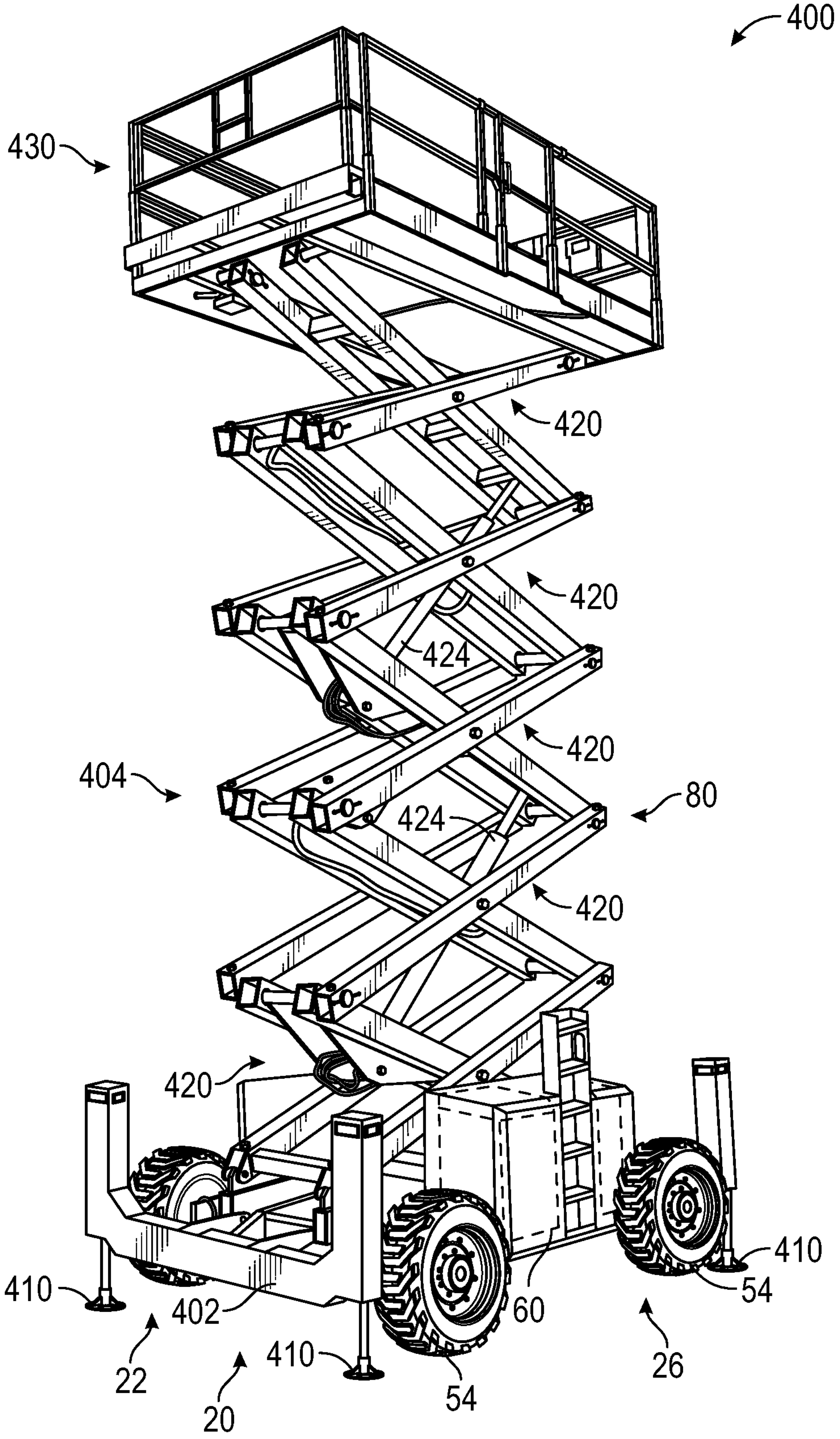
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Vehicle Lift System Visual Guidance Configuration

Figure 14:
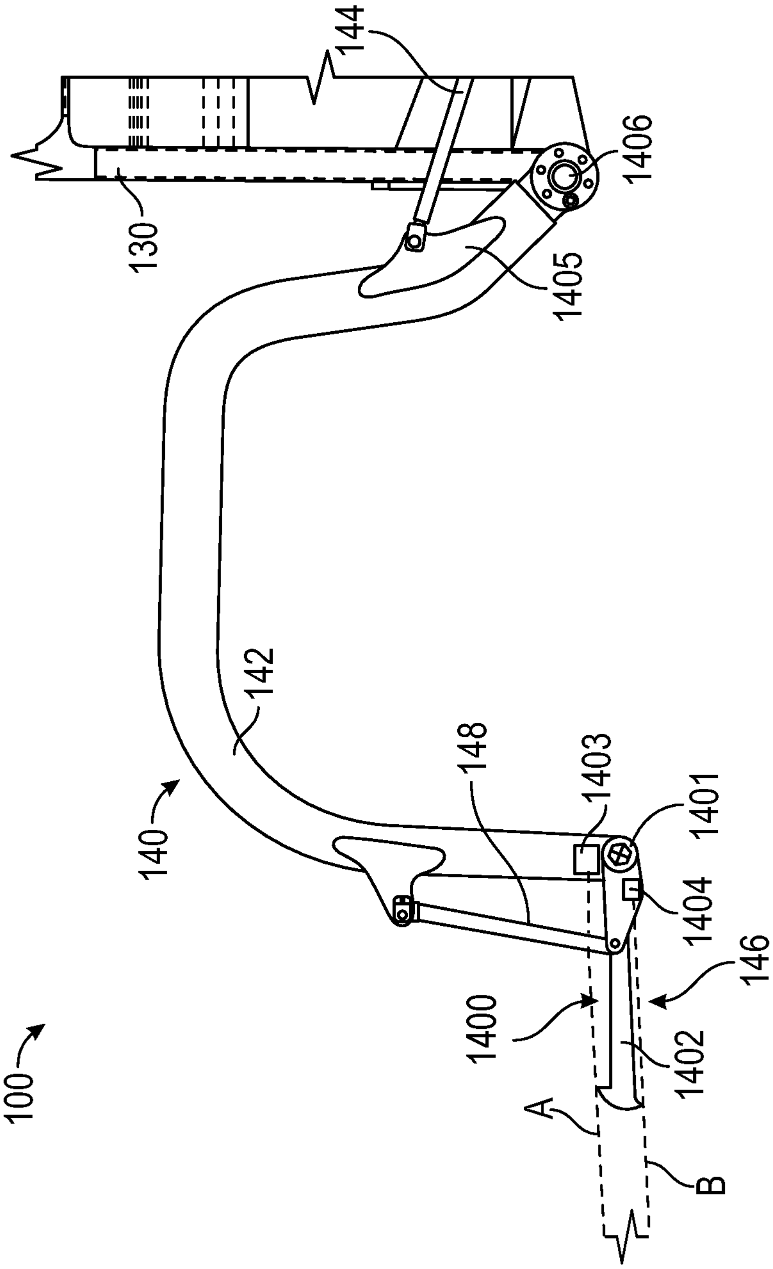
FIG. 14 is a side view of the lift assembly of FIG. 1 configured with a visual guidance system, according to an exemplary embodiment.

Referring now to FIG. 14, the lift assembly 140 is shown with a visual guidance system 1400, according to some embodiments. As shown, the lift assembly 140 is in a working position, as opposed to a stowed position depicted in FIG. 4. For example, the lift arm actuators 144 are positioned such that extension and retraction thereof pivots the lift arms 142 about a lift arm pivot 1406 from the stowed position depicted in FIG. 4 to the working position depicted in FIG. 14. As shown, the forks 146 of the lift assembly 140 may include, in addition to some or all of the components mentioned above, fork brackets 1401 and fork tongs 1402 making up the forks 146, lift arm brackets 1405, and lift arm pivots 1406. In the working position, the lift arm actuators 144 may extend the lift arms 142 (via the lift arm brackets 1405) until the forks 146 are positioned on or near a ground surface as shown. Further, the articulation actuators 148 may extend such that the fork brackets 1401 rotate with respect to the lift arms 142, thereby rotating the fork tongs 1402 into a position to engage an external target.

The visual guidance system 1400 may include a first projector 1403 and a second projector 1404. The projectors 1403 and 1404 can include one or more lighting assemblies to generate light. The projectors 1403 and 1404 can include one or more light emitting diodes (LEDs), lamps, or lasers for example, that generate visible light (i.e., light within the visible spectrum, having a wavelength between about 400 nm and 700 nm). The opposing lift arm 142 and fork bracket 1401 may additionally or alternatively include one or more projectors 1403 and 1404. In some examples, the projectors 1403 and 1404 are configured to emit light outside of the visible spectrum (e.g., infrared light, ultraviolet light). In some examples, the projectors 1403 and 1404 are positioned on opposite sides of the lift arms 142. As shown, the projectors 1403 and 1404 may be positioned on the outside of the lift arms 142. In other embodiments, the projectors 1403 and 1404 are positioned on the inside of the lift arms 142. As shown, the first projector 1403 is coupled to one of the lift arms 142 and the second projector 1404 is coupled to the fork bracket 1401. In other embodiments, both projectors 1403 and 1404 are coupled to the lift bracket 1401. In other embodiments still, both projects 1403 and 1404 are coupled to the lift arm 142. In even other embodiments, one or both of the projectors 1403 and 1404 are coupled to the fork tong 1402. It should be appreciated that the projectors 1403 and 1404 may be positioned on any number of places on the refuse vehicle 10 in order to accomplish the visual guidance systems and methods described herein.

The projectors 1403 and 1404 are each arranged to emit light substantially outward and ahead of the lift assembly 140. The projectors 1403 and 1404 may be offset vertically from one another. As shown, the first projector 1403 is positioned in line with an upper surface of the fork tong 1402 (e.g., the tip of the distal extension of the fork tong 1402), and the second projector 1404 is positioned in line with a lower surface of the fork 146 (particularly a lower surface of the fork tong 1402). In this sense, the projectors 1403 and 1404 may be arranged to emit light in line (e.g., parallel) with the fork tongs 1402, while also defining an upper boundary and a lower boundary of the fork tongs 142. Advantageously, this may facilitate alignment of the forks 146 (and specifically the fork tongs 1402) in order to engage a refuse container to selectively coupled the refuse container to the lift arms 142. The projectors 1403 and 104 may have a fan angle between 0 and 180 degrees. Preferably, the projectors 1403 and 1404 have a fan angle between 45 and 180 degrees. Generally, the projectors 1403 and 1404 have a fan angle sufficient to project an image or a line across the entire width of an object to be engaged, such as a refuse container. As suggested above, each of the lift forks 146 may be received within a corresponding pocket defined by the refuse container. The projectors 1403 and 1404 may thus project visible light along lines A and B, respectively. Thus, the projectors may project visible lines onto a refuse container (and, in some cases, into the corresponding pocket(s) of a dumpster), thus allowing an operator to identify how the forks 146 (and, in some embodiments, the fork tongs 1402 specifically) are oriented. For example, the projections of the projectors 1403 and 1404 may be used to show a vertical position of the forks 146, a lateral position of the forks 146, as well as a yaw and/or angle of the forks 146. The projectors 1403 and 1404 may be positioned to emit lines perpendicular with each other, or otherwise positioned uniquely relative to the other of the projectors 1403 and 1404.

In some embodiments, the projectors 1403 and 1404 each include at least one rotational actuator such that the projectors 1403 and 1404 may be rotated individually or together. For example, in cases where one or both of the projectors 1403 and 1404 are not coupled to the fork 146 (e.g., the first projector 1403 as depicted), and thus may not be in line with the fork tong 1402 due to pivoting the fork tong 1402 with respect to the lift arm 142, the projectors 1403 and 1404 may advantageously be rotated by the rotational actuators in order to maintain a projection (lines A and/or B) in line with the current rotational position of the fork tong 1402. The rotational actuators may be controlled by a controller configured to monitor the arrangement and/or position of the components of the lift assembly 140 and control the orientation of the projectors 1403 and 1404 accordingly. As another example, by rotating the projectors 1403 and/or 1404, the projectors 1403 and/or 1404 may serve a wide array of purposes beyond the alignment of the forks 146 with an external target. For example, one or both of the projectors 1403 and 1404 may be positioned (via a rotational actuator, in some embodiments and in this example) to project light to a spot on the ground that corresponds to the forks 146. In other words, regardless of the rotational position of the lift arms 142, one or both of the projectors 1403 and 1404 may be rotated to identify where the end of the lift arm 142 coupled to the forks 146 will make contact with the ground, should the lift assembly 140 be rotated to that degree. Similarly, the projectors 1403 and 1404 may be rotated upwards to identify where an upper-most point of the lift assembly 140 may contact a low ceiling. The projectors 1403 and 1404 may project a line, such that the rotation of the projectors 1403 and 1404 causes the line to rotate.

While shown with reference to the front-loading arrangement of FIG. 4, the projectors 1403 and 1404 can be positioned on any of the vehicles shown in FIGS. 1-13 to provide an indication of the boundary of movement of the vehicle and project that boundary onto a surface external to the vehicle.

Vehicle Boundary Light Configuration

Figure 15:
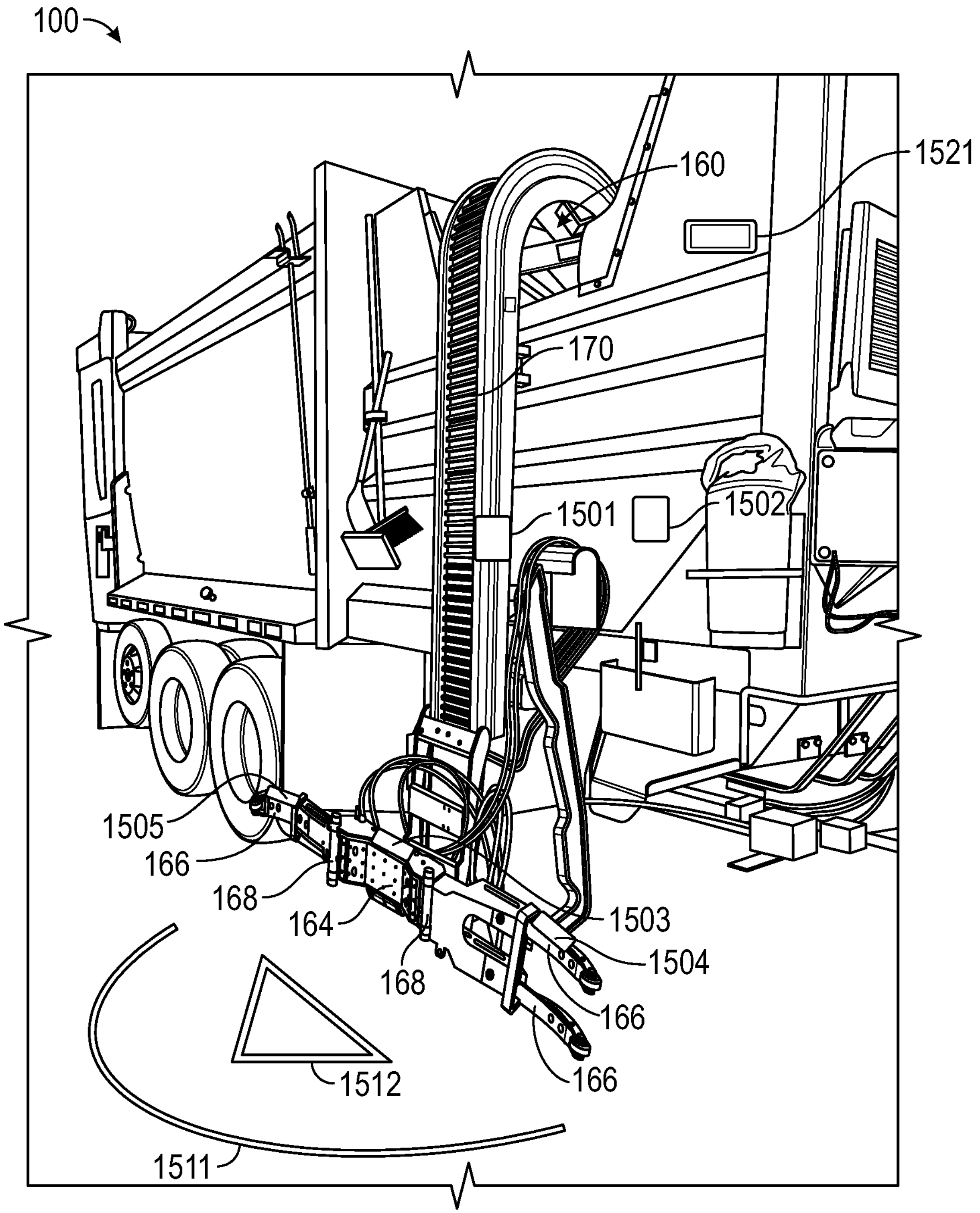
FIG. 15 is a perspective view of the lift assembly of FIG. 1 configured as a side-loading refuse vehicle with a visual guidance system, according to an exemplary embodiment.
Figure 16:
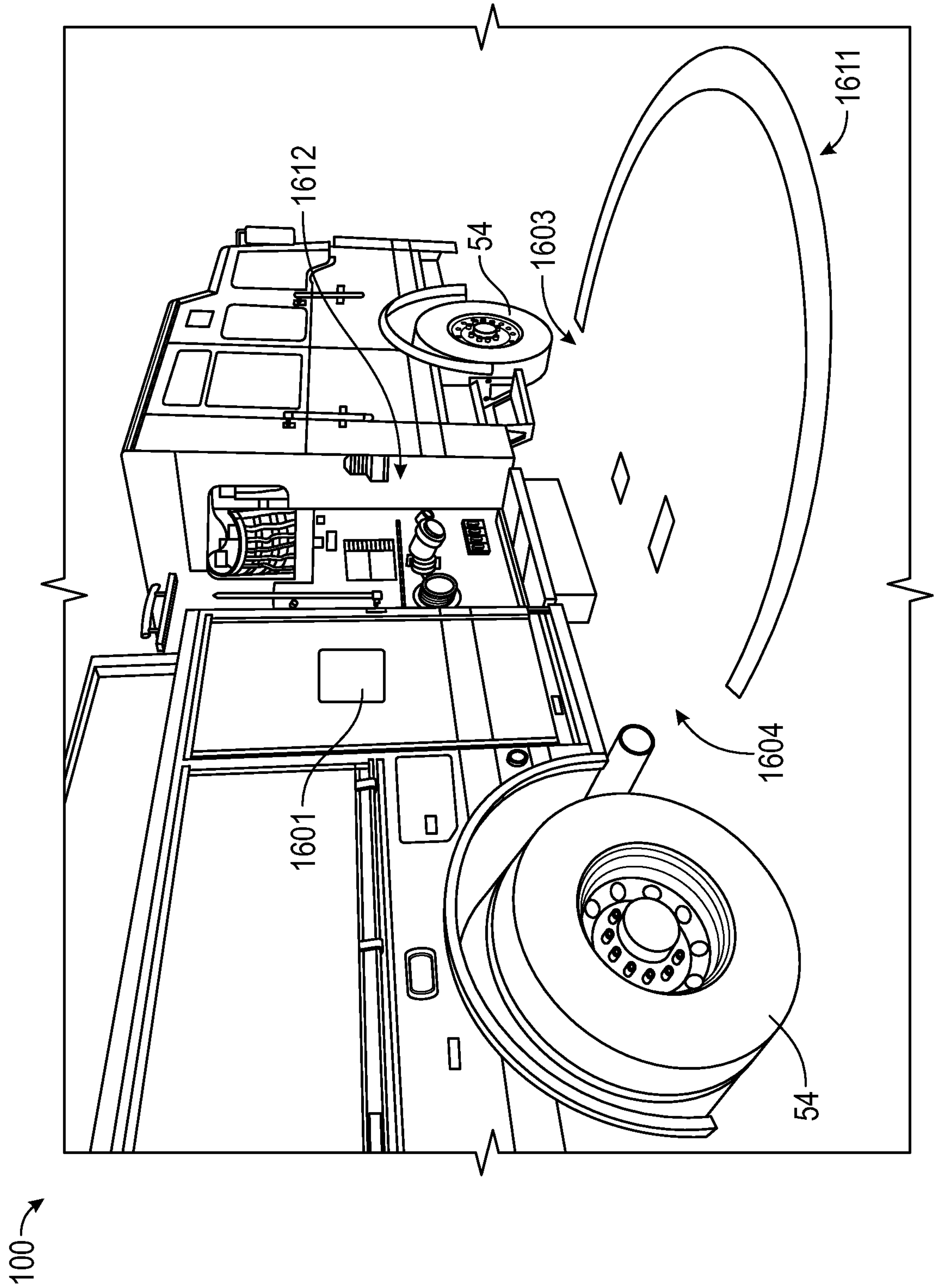
FIG. 16 is a perspective view of the lift assembly of FIG. 1 configured as a fire fighting vehicle with a visual guidance system, according to an exemplary embodiment.
Figure 17:
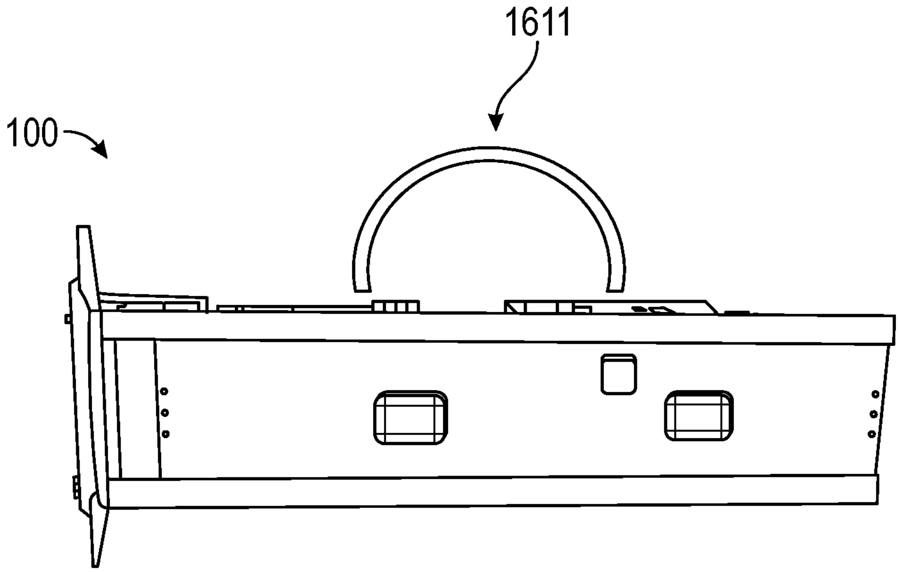
FIG. 17 is a top view of the lift assembly of FIG. 1 configured as a fire fighting vehicle with a visual guidance system, according to an exemplary embodiment.

Referring now to FIGS. 15-17, the refuse vehicle 100 may be configured to project one or more visual indications on the support surface (e.g., roads, the ground, etc.) surrounding the refuse vehicle 100. Such visual indications may be used to provide warnings, instructions, or other indications to operators of the refuse vehicle 100, passersby, autonomous control systems of other vehicles, and so on. Referring specifically to FIG. 15, the refuse vehicle 100 is shown configured as a side-loading refuse vehicle, as discussed above with reference to FIGS. 5-8. In such configurations, the refuse vehicle 100 may include one or more projectors, which may be similar to or different than the projectors 1403 and 1404 discussed above with reference to FIG. 14. As shown, the refuse vehicle 100 may include any combination of a first projector 1501 coupled to the track 170, a second projector 1502 coupled to an outer surface of the refuse vehicle 100 (near the lift assembly 160, in particular and as shown), a third projector 1503 coupled to the main body 164, a fourth projector 1504 coupled to one of the grabber fingers 166, and/or a fifth projector 1505 coupled to another of the grabber fingers 166. One or more of the first, second, third, fourth, or fifth projectors 1501-1505 may be utilized to display visual indications on a surface external to the refuse vehicle 100, such as the ground. The external surface may also be substantially vertical, such as a wall. For example, the projectors 1501-1505 may be configured to generate and emit light in order to display a visual arc 1511 and an alignment indication 1512 on a support surface such as the ground near or around the refuse vehicle 100. For example, the projectors 1501-1505 may be configured in a similar manner as the projectors 1403 and/or 1404 discussed above with reference to FIG. 14. As shown, the visual arc 1511 may be projected onto the support surface surrounding the lift assembly 160. Although the visual arc 1511 is depicted herein as an arc (or semi-circle or the like) and the alignment indication 1512 is depicted herein as a triangle, it should be appreciated that the projectors 1501-1505 may be configured to provide visual indications of any number of size, shape, or color in order to facilitate the function of the lift assembly 160 as described herein.

In some embodiments, the visual arc 1511 may be displayed on the support surface in order provide a warning for surrounding pedestrians to avoid the area within the visual arc 1511 (e.g., the area between the visual arc 1511 and the lift assembly 160) during the operation of the lift assembly 160. The visual arc 1511 may identify a perimeter of the working envelope, range of motion, and/or general operation of a sub-system of the lift assembly 160 or the entire lift assembly 160. For example, the visual arc 1511 may define a perimeter of a work area defined by the motion of the grabber fingers 166 during the process of engaging a refuse container to selectively couple the refuse container to the lift assembly 160. Further, the visual arc 1511 may identify a perimeter of the refuse container itself, insofar as it extends beyond a perimeter associated with the operation of the lift assembly 160 alone.

In some embodiments, the cab interior 42 may include a user interface that an operator may use to identify a type of refuse container (e.g., a residential garbage can, a recycling bin, a carry can, a dumpster, etc.) that the refuse vehicle 100 will engage with the lift assembly 160. In turn, a controller of the refuse vehicle 100 may receive a user input identifying the type of refuse container and one or more of the projectors 1501-1505 may be adjusted (e.g., rotated, translated, re-oriented, etc.) by one or more actuators coupling the projectors 1501-1505 to the refuse vehicle 100, such that the visual arc 1511 expands, contracts, or is otherwise redefined on the support surface to provide a visual identification of a boundary that accommodates the operation of the lift assembly 160, including the particular refuse container to be engaged by the lift assembly 160.

In other embodiments, the refuse vehicle 100 may include one or more sensors, such as a sensor 1521, integrated into the body of the refuse vehicle 100. The sensor 1521 may be configured as one or more cameras configured to detect and determine the dimensions of a refuse container that the lift assembly 160 will engage. In other embodiments, the sensor 1521 may be configured as one or more radars. The sensor 1521 may provide sensor data to a controller of the refuse vehicle 100 indicating the existence of objects external to the refuse vehicle 100. In some embodiments, the controller may automatically adjust the projectors 1501-1505 to update the dimensions of the visual arc 1511 in order to accommodate the dimensions of a refuse container near the lift assembly 160. In other embodiments, the sensor 1521 may detect the presence of a refuse container, provide imagery or footage of the refuse container to the operator of the refuse vehicle 100 via a user interface within the cab interior 42, and receive a selection from the operator to confirm that the detected refuse container will be engaged by the lift assembly 160. In turn, the controller may adjust the projects 1501-1505 to update the dimensions of the visual arc 1511 in order to accommodate the dimensions of the selected refuse container.

In some embodiments, the alignment indication 1512 may identify a pre-defined area or location on the support surface relative to the body of the refuse vehicle 100 in order to guide operators of the refuse vehicle 100 to position the refuse vehicle 100 relative to a refuse container. For example, the alignment indication 1512 may define an optimal location for a refuse container to be positioned relative to the refuse vehicle 100 such that the grabber assembly 162 may properly engage the refuse container. As described above, the sensor 1521 may provide sensor data to a controller associated with the projectors 1501-1505, such that the particular location and orientation of the alignment indicator is adjusted for a particular refuse container. For example, a smaller refuse container (e.g., a small garbage can as opposed to a larger recycling bin) may be ideally oriented close to the grabber assembly 162. Accordingly, the projectors 1501-1505 may be adjusted to reposition the alignment indicator close to the body of the refuse vehicle 100 and/or close to the grabber assembly 162. In various embodiments, operators of the refuse vehicle 100 may be able to view the alignment indicator via one or more mirrors arrange about the cab 40. In some embodiments, the alignment indicator may be visible to operators outside the refuse vehicle 100 for manual positioning of the refuse container relative to the refuse vehicle 100 for allowing the gabber assembly 162 to engage the refuse container.

In some embodiments, the sensor 1521 may be configured to provide alerts based on physical obstruction of the support surface relative to the position of the projected visual arc 1511 and the alignment indicator 1512. For example, the sensor 1521 may be configured (as a camera, radar, or similar sensor) to determine that a pedestrian as crossed the visual arc 1511 and is now between the visual arc 1511 and the body of the refuse vehicle 100. In such cases, the sensor 1521 may provide a message to a controller that in turn issues an alert on the user interface within the cab interior 42 indicating the presence of an individual within the visual arc 1511. Alternatively, the controller may respond to the message from the sensor 1521 by deactivating or locking the function of the grabber assembly 162 in order to prevent any hazards involving the function of the grabber assembly 162 and the individual within the visual arc 1511.

Referring now to FIGS. 16 and 17, the refuse vehicle 100 is shown projecting a visual arc 1611 by a projector 1601 coupled to the body of the refuse vehicle 100. As shown, the projector 1601 (which may be configured similar to one or more of the projectors 1501-1505) may project the visual arc 1611 on the support surface to warn or prevent pedestrians from approaching an operational area 1612 around the exterior of the refuse vehicle 100. For example, the refuse vehicle 100 may be configured as a fire truck or other service vehicle with various components or tools accessible from the exterior of the vehicle 100. For example, the visual arc 1611 is shown to provide an arc extending from a front 1604 of one of the wheel and tire assemblies 54, encircling the operational area 1612 (which may facilitate one or more components or tools accessible on the exterior of the refuse vehicle 100), and extending to a rear 1603 of one of the wheel and tire assemblies beyond the operational area. As discussed above, the refuse vehicle 100 may include one or more sensors configured to determine the presence of a pedestrian within the visual arc 1611. In various implementations, such sensors may be configured to provide an alert (visual, audible, etc.) to the pedestrian to leave the area within the visual arc 1611 in order to maintain the accessibility of the operational area 1612. The operational area 1612 may also include one or more doors into the cabin 42 of the vehicle 100 to ensure access to the inside of the vehicle 100. In some embodiments, multiple operational areas 1612 may each be indicated by the projector 1601 or by multiple projectors 1601. The operational area 1612 may be on any side of the vehicle 100. While shown as an arc, the visual arc 1611 may be any shape.

Referring still to FIGS. 16 and 17, one or more characteristics of the visual arc 1611 may vary based on the type of vehicle 100 or an operational mode of a vehicle 100. The operational modes may be received as an input from a user. In some embodiments the operational modes are activated automatically based on the operation of one or more other components of the vehicle 100. For example, the vehicle 100 may be a fire truck, and when the vehicle 100 is in a first mode such as a parked mode, the visual arc 1611 may not be displayed or may only surround or otherwise indicated the areas around one or more doors of the vehicle 100. In a different mode, for example a pump mode when an internal pump of the vehicle 100 is activated, the visual arc 1611 may be extend to surround the pump controls, as shown in FIG. 16. Still in another mode, for example a safety mode for use when the fire truck is parked behind a hazard and used to separate a flow of traffic from the hazard, the visual arc 1611 may extend as a line laterally out away from the fire truck to indicate to drivers to change lanes or otherwise move away. It should be understood that these modes exemplary only, and other modes may exists such as a residential mode, a commercial mode, a recycling mode, a waste mode, a ladder mode, an access mode, or any other operational mode for a vehicle as shown in FIGS. 1-13. In some embodiments, a user can change the shape or size of the visual arc 1611 from within the operational area 1612, either via a user input on the exterior of the vehicle 100 or via a mobile device. The mobile device may be communicably coupled with a controller of the vehicle 100, and allow a user to adjust the shape, size, location, or operational mode corresponding to the visual arc 1611.

Figure 18:
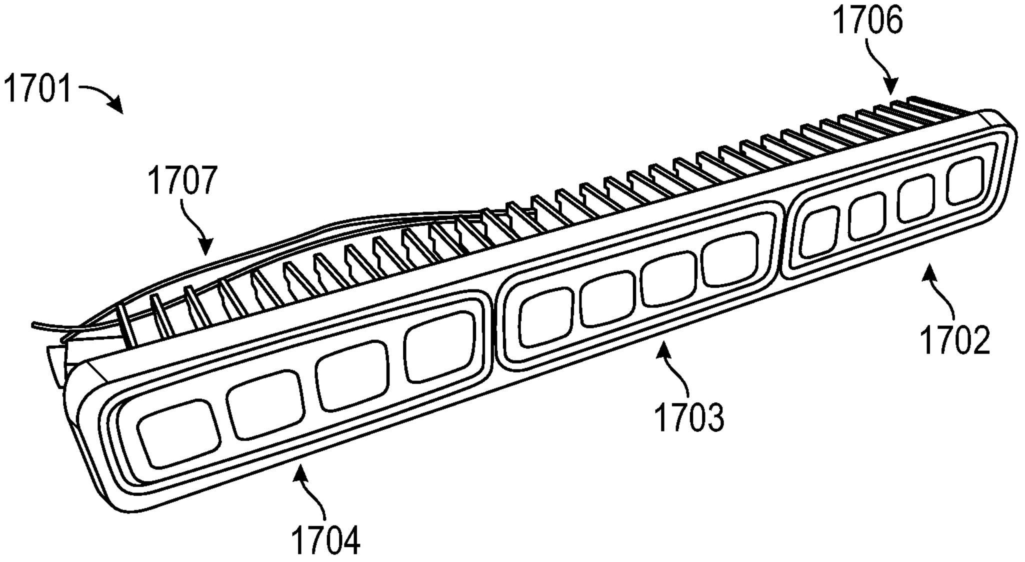
FIG. 18 is a light emitter for a visual guidance system, according to an exemplary embodiment.
Figure 19:
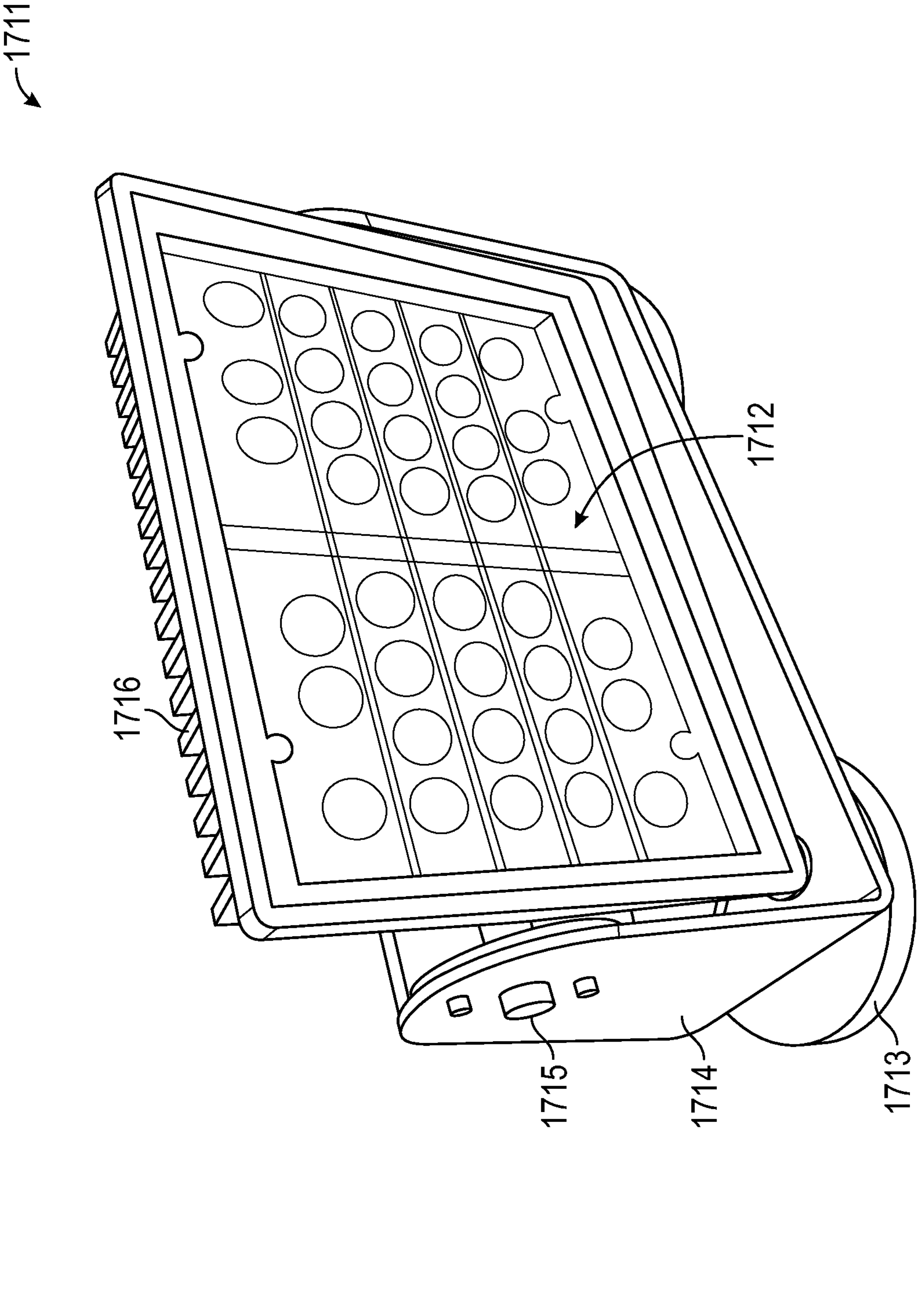
FIG. 19 is a light emitter for a visual guidance system, according to an exemplary embodiment.

Referring to FIGS. 18 and 19, projectors 1701 and 1711 are shown, according to various embodiments. For example, one or more of the projectors 1501-1505 depicted above with reference to FIG. 15, and/or one or the projector 1601 depicted above with reference to FIG. 16, may be configured as the projectors 1701 and/or 1711 as depicted. Referring specifically to FIG. 18, the projector 1701 may include a first light emitter 1702, a second light emitter 1703, and/or a third light emitter 1704. The light emitters 1702-1704 may be coupled together by a base 1706, which may facilitate the routing of one or more cables 1707 to a power source stored on the refuse vehicle 100, such as the batteries 60. Each of the light emitters 1702-1704 may each include one or more individual light emitters. The one or more cables 1707 may receive control messages from a controller within or communicably coupled to a vehicle 100. In this sense, projector 1701 may be controlled by the controller to generate and emit light using any combination of the light emitters 1702-1704 and any of the individual light emitters within each of the light emitters 1702-1704. Furthermore, the light emitters 1702-1704 may be controlled to emit light of various colors (e.g., red, blue, green, etc.), lines of various thicknesses, or vary other characteristics of the light. For example, the light emitters 1702-1704 may be line or pattern generators. In some embodiments one or more of the light emitters 1702-1704 may be lasers. In some embodiments, the light emitters 1702-1704 include different types of light emitters. Referring specifically to FIG. 19, the projector 1711 may include a matrix 1712 (e.g., one or more arrays) of light emitters that may be individually operated as described above. Moreover, the matrix 1712 of light emitters may be housed by a base 1716, which is pivotally coupled to a bracket 1714 by a pivot 1715. The bracket may be coupled to the body of the refuse vehicle 100 by coupling members 1713. Furthermore, the pivot 1715, along with the matrix 1712 of light emitters, may be engaged by an actuator, which may receive control signals from a controller. In this sense, the arrangement of light emissions, as well as the orientation of the projector 1712, may be controlled by the controller to project visual indications to the support surface as described herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims (e.g., +/−10%).

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:

a chassis;

a body coupled to the chassis and comprising a cab; and a lift assembly coupled to at least one of the chassis or the body, the lift assembly comprising:

a first arm;

a second arm;

an implement coupled to the first arm and the second arm;

an actuator positioned to pivot the first arm and the second arm to facilitate repositioning the implement between a plurality of positions; and one or more projectors coupled to the implement, the one or more projectors positioned to provide a visual indication of alignment of the implement with respect to an external target.

2. The refuse vehicle of claim 1, wherein the one or more projectors provide the visual indication by projecting at least one line across a target to be engaged with by the implement.

3. The refuse vehicle of claim 1, wherein the one or more projectors provide the visual indication by projecting at least a first line and a second line perpendicular to the first line.

4. The refuse vehicle of claim 1, wherein the implement comprises a first fork coupled to the first arm and a second fork coupled to the second arm, the first fork and the second fork configured to engage with corresponding slots in a target object.

5. The refuse vehicle of claim 4, wherein the one or more projectors comprises a first projector coupled to the first fork and a second projector coupled to the second fork.

6. The refuse vehicle of claim 4, wherein the one or more projectors comprise a first projector configured to project a first visual indication coplanar with an upper surface of the first fork and the second fork and a second projector configured to project a second visual indication coplanar with a lower surface of the first fork and the second fork.

7. The refuse vehicle of claim 4, wherein the one or more projectors are rotatably coupled to the implement, the refuse vehicle further comprising:

one or more projector actuators coupled to the one or more projectors and the implement and configured to rotate the one or more projectors relative to the implement.

8. The refuse vehicle of claim 7, wherein the one or more projectors are rotatable between a first position wherein the one or more projectors emit the visual indication substantially forwards relative to the body and a second position wherein the one or more projectors emit the visual indication substantially down towards a ground plane.

9. The refuse vehicle of claim 7, further comprising a controller communicably coupled to the one or more projector actuators, wherein the controller is configured to receive a user input and rotate the one or more projectors based on the user input.

10. The refuse vehicle of claim 4, wherein the one or more projectors comprises a first projector coupled to the first fork and a second projector coupled to the first fork vertically apart from the first projector, wherein one of the first projector or the second projector is configured to project a first visual indication coplanar with an upper surface of the first fork and the other of the first projector or the second projector is configured to project a second visual indication coplanar with a lower surface of the first fork, and wherein the first projector and the second projector are rotatable relative to the first fork by a first projector actuator and a second projector actuator.

11. A refuse vehicle comprising:

a chassis;

a body coupled to the chassis and comprising a cab; and a lift assembly coupled to at least one of the chassis or the body, the lift assembly comprising:

an implement coupled to the at least one of the chassis or the body, the implement comprising a first movable appendage and a second moveable appendage;

an actuator positioned to move at least one of the first movable appendage or the second movable appendage to facilitate engaging the implement with an external target; and one or more projectors coupled to at least one of the first moveable appendage or the second moveable appendage, the one or more projectors positioned to provide a visual indication of alignment of the implement with respect to the external target.

12. The refuse vehicle of claim 11, wherein the implement has a first range of motion, and wherein the visual indication comprises an arc encircling the first range of motion.

13. The refuse vehicle of claim 12, wherein the visual indication further comprises a center marker indicating a center of the implement.

14. The refuse vehicle of claim 12, wherein the first moveable appendage is a first arm and the second moveable appendage is a second arm, wherein the first arm and the second arm are rotatable around a lateral axis relative to the chassis.

15. The refuse vehicle of claim 12, wherein the first moveable appendage is a first finger and the second moveable appendage is a second finger, wherein the first finger and the second finger are rotatable around a first vertical axis and a second vertical axis relative to the chassis.

16. The refuse vehicle of claim 15, further comprising:

a controller coupled to the chassis and communicably coupled to the one or more projectors, the controller configured to receive a signal, wherein the signal indicates a type of the external target, and wherein the controller is further configured to adjust at least one of a width, a height, a shape, or a color of the visual indication based on the type of the external target.

17. The refuse vehicle of claim 16, further comprising at least one of a sensor coupled to the body and configured to identify the type of the external target and generate the signal or a user interface device configured to receive a user input identifying the type of the external target and generate the signal based on the user input.

18. The refuse vehicle of claim 16, further comprising a boundary sensor configured to detect an object crossing the visual indication, wherein the controller is further configured to generate at least one of an audible or visual alert based on the detection of the object crossing the visual indication.

19. The refuse vehicle of claim 11, further comprising one or more stationary projectors coupled to the body, and wherein the visual indication comprises a first visual indication from the one or more projectors coupled to the implement and a second visual indication from the one or more stationary projectors, wherein movement of the first moveable appendage or the second moveable appendage results in movement of the first visual indication relative to the chassis.

20. A refuse vehicle comprising:

a chassis;

a body coupled to the chassis and comprising a cab;

at least one manual system coupled to the body and operable from an exterior of the body, wherein an operational zone comprises an area proximate the manual system; and one or more projectors coupled to the body, the one or more projectors positioned to provide a visual indication of the operational zone on a ground plane.

* * * * *